United States Patent
Davis (10) Patent No.: US 11,689,355 B2
(45) Date of Patent: Jun. 27, 2023

(54) METHOD AND SYSTEM FOR THE ATOMIC EXCHANGE OF BLOCKCHAIN ASSETS USING TRANSIENT KEY PAIRS

(71) Applicant: MASTERCARD INTERNATIONAL INCORPORATED, Purchase, NY (US)

(72) Inventor: Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 288 days.

(21) Appl. No.: 17/192,194

(22) Filed: Mar. 4, 2021

(65) Prior Publication Data
US 2022/0286275 A1   Sep. 8, 2022

(51) Int. Cl.
| | | |
|---|---|---|
| H04L 9/06 | (2006.01) |
| H04L 9/30 | (2006.01) |
| G06Q 20/40 | (2012.01) |
| H04L 9/32 | (2006.01) |
| H04L 9/00 | (2022.01) |

(52) U.S. Cl.
CPC ......... *H04L 9/0643* (2013.01); *G06Q 20/401* (2013.01); *H04L 9/30* (2013.01); *H04L 9/3247* (2013.01); *H04L 9/50* (2022.05)

(58) Field of Classification Search
None
See application file for complete search history.

(56) References Cited

U.S. PATENT DOCUMENTS 11,310,060 B1 *   4/2022   Poelstra ................ H04L 9/3066

OTHER PUBLICATIONS

Kuwahara, Ichiro "Adaptor Signature Series" Blog Posts 1-5 [online] Medium, Oct. 8, 2020 [retrieved Feb. 3, 2023], Retrieved from the Internet: URL: https://medium.com/crypto-garage/adaptor-signature-schnorr-signature-and-ecdsa-da0663c2adc4 (Year: 2020).*

(Continued)

*Primary Examiner* — Linglan Edwards
*Assistant Examiner* — Joshua Raymond White
(74) *Attorney, Agent, or Firm* — Panitch Schwarze Belisario & Nadel LLP (57) ABSTRACT

A method for atomic exchange of assets on multiple blockchains using transient key pairs includes: generating, by a first computing device, a proposal message, the proposal message including at least a first transaction value, a first network identifier corresponding to a first blockchain, a second transaction value, a second network identifier corresponding to a second blockchain, and a swap public key of a swap cryptographic key pair; generating, by the first computing device, a first digital signature for the proposal message; encrypting, by the first computing device, the first digital signature using the swap public key and a first private key of a first cryptographic key pair; appending, by the first computing device, the encrypted first digital signature to the generated proposal message; and transmitting, by the first computing device, the generated proposal message with appended encrypted first digital signature to a second computing device.

14 Claims, 7 Drawing Sheets

(56) References Cited

OTHER PUBLICATIONS

Hoenisch, Philipp et al. "Atomic Swaps between Bitcoin and Monero" [online] Arxiv, Feb. 2, 2021 [retrieved Feb. 3, 2023], Retrieved from the Internet: URL: https://arxiv.org/pdf/2101.12332.pdf (Year: 2021).*

Deshpande, Apoorvaa et al. "Privacy-Preserving Cross-Chain Atomic Swaps" [online] WTSC, Aug. 2020 [retrieved Feb. 3, 2023], Retrieved from the Internet: URL: http://fc20.ifca.ai/wtsc/WTSC2020/WTSC20_paper_20.pdf (Year: 2020).*

* cited by examiner

METHOD AND SYSTEM FOR THE ATOMIC EXCHANGE OF BLOCKCHAIN ASSETS USING TRANSIENT KEY PAIRS

FIELD

The present disclosure relates to the atomic exchange of assets on multiple blockchains using transient key pairs, specifically the use of key pairs and digital signatures to enable an atomic exchange of assets on two blockchains without modification or specific implementation based on blockchain type.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

As blockchain has gained in popularity, the technology has begun to be used for a variety of different applications and multiple types of digital currencies and assets. The creation of a new blockchain can be done using a single computing device in an extremely short period of time, which has resulted in thousands of different blockchains with their own types of implementations and associated digital currencies. In some instances, one or more parties may be interested in conducting a transaction or other exchange using digital currency or other assets that are spread across two different blockchains, such as performing a currency exchange from one blockchain currency to another.

However, with current technology there is no ability to conduct a single transaction across both blockchains. Thus, to make such an exchange, a transaction must be conducted on each blockchain, which requires both parties to participate in a transaction on each chain. In a case where each party is a sender in one of the blockchains, they must transfer their currency or digital asset to the other party without a guarantee that the other party will perform their own respective transfer. To mitigate the potential for fraud, parties will often utilize an escrow service, where each party will transfer their respective digital currency or asset to the escrow service, which will further transfer the assets to the appropriate party, or reverse an initial transaction as necessary. However, this solution requires additional transactions as well as the participation of a third party, which can often come at a significant expense and require additional time and processing.

In some cases, some blockchains have begun developing protocols and other configurations for asset exchanges with other blockchains. However, because of the differences in implementations of blockchains, how transactions are formatted, and other variations, such protocols and other configurations have to be specially designed and tailored for the specific blockchains to which they apply. Thus, each of the blockchains must have additional configuration data provided to every node in the blockchain network for each other blockchain to which they are eligible for asset exchanges. With thousands of blockchains in existence, and with the configuration having to be specifically designed for each one, this is a daunting and nearly impossible task.

Thus, there is a need for a solution that is agnostic as to the implementation of the blockchain to enable an asset exchange to be made across any two blockchains.

SUMMARY

The present disclosure provides a description of systems and methods for atomic exchange of assets on multiple blockchains using transient key pairs. When two parties agree to conduct an atomic exchange of assets, they can generate transaction values for the respective transactions on each of the blockchains. These transactions are combined with network identifiers for the corresponding blockchain networks, where this set of data is then digitally signed by one of the two parties, such as the sender. This digital signature is then encrypted with a private key of that party as well as a public key of a new cryptographic key pair generated specifically for the swap. The encrypted digital signature is appended to the data along with the swap public key and provided to the other party, such as the receiver. The receiver then generates their own digital signature over the data and encrypts the signature with their own private key and the swap public key. This completed package is then submitted to at least one of the two blockchains for addition thereto. Each of the parties can then view the message with the signatures to ensure that both parties have agreed on the transaction. The transactions can be performed, and, once completed, a confirmation message posted to the blockchain with the private key of the new cryptographic key pair, which can enable any entity to perform a validation of the agreed-upon transactions by decrypting the digital signatures, which can then be validated using the public keys of the respective entities. The result is an atomic exchange of assets agreed by both parties that can be performed on any two blockchains without any modification thereto, which can also be audited by any third party using only the public keys made available by the participants.

A method for atomic exchange of assets on multiple blockchains using transient key pairs includes: generating, by a first computing device, a proposal message, the proposal message including at least a first transaction value, a first network identifier corresponding to a first blockchain, a second transaction value, a second network identifier corresponding to a second blockchain, and a swap public key of a swap cryptographic key pair; generating, by the first computing device, a first digital signature for the proposal message; encrypting, by the first computing device, the first digital signature using the swap public key and a first private key of a first cryptographic key pair; appending, by the first computing device, the encrypted first digital signature to the generated proposal message; and transmitting, by the first computing device, the generated proposal message with appended encrypted first digital signature to a second computing device.

A system for atomic exchange of assets on multiple blockchains using transient key pairs includes: a first computing device, a second computing device, a first blockchain, and a second blockchain, wherein the first computing device generates a proposal message, the proposal message including at least a first transaction value, a first network identifier corresponding to the first blockchain, a second transaction value, a second network identifier corresponding to the second blockchain, and a swap public key of a swap cryptographic key pair, generates a first digital signature for the proposal message, encrypts the first digital signature using the swap public key and a first private key of a first cryptographic key pair, appends the encrypted first digital signature to the generated proposal message, and transmits the generated proposal message with appended encrypted first digital signature to a second computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Atomic Exchange of Digital Assets

Figure 1:
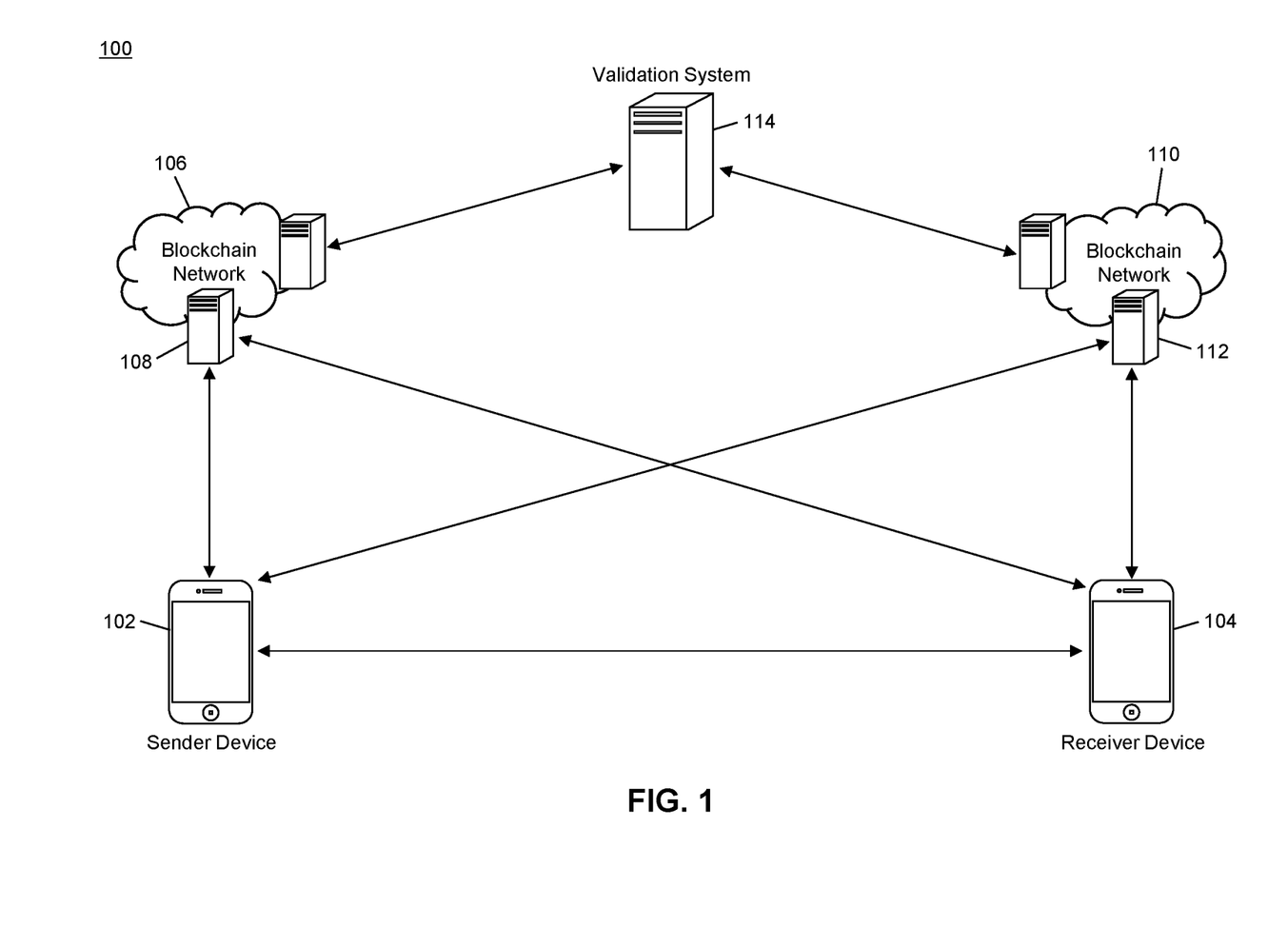
FIG. 1 is a block diagram illustrating a high level system architecture for atomic exchange of assets in multiple blockchains in accordance with exemplary embodiments.

FIG. 1 illustrates a system 100 for the atomic exchange of digital assets on multiple blockchains using transient key pairs that enables assets to be exchanged agnostic of the formatting and implementation of the blockchains.

In the system 100, a sender device 102 and receiver device 104 may be interested in conducting an exchange of digital assets that are held on two different blockchains. As discussed herein, the two blockchains may be of any implementation, formatting, etc. where the methods discussed below may be applicable regardless of the type or implementation of blockchain involved, as long as the blockchain stores digital assets where the assets may be transferred from one owner or controlling entity to another. The sender device 102 and receiver device 104 may be any type of computing device, such as discussed in more detail below in FIGS. 2 and 5, such as a cellular phone, smart phone, desktop computer, laptop computer, tablet computer, smart television, notebook computer, etc. Each of the blockchains may be managed and maintained by a blockchain network, such as the first blockchain network 106 and second blockchain network 110, as illustrated in FIG. 1.

Figure 5:
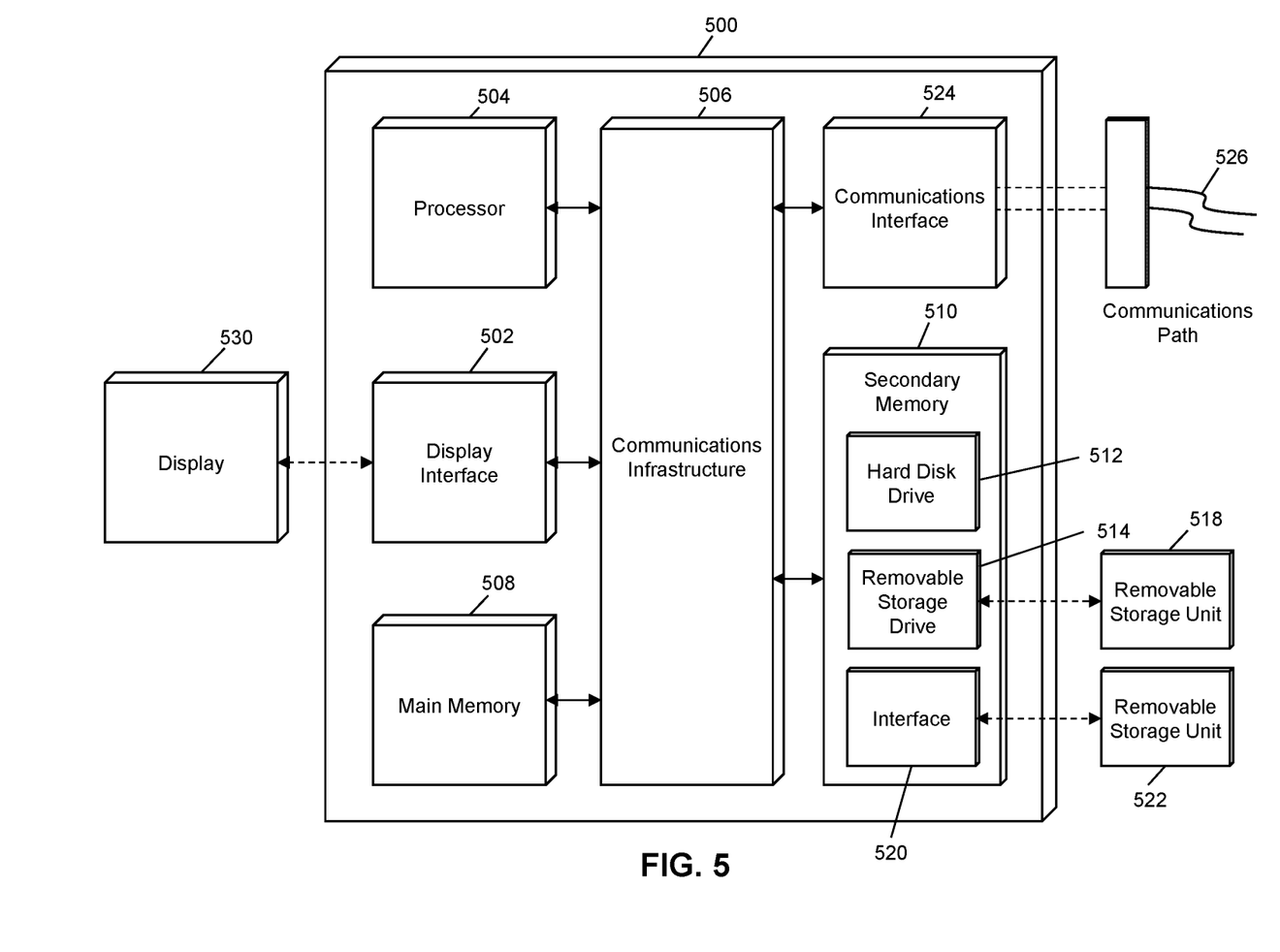
FIG. 5 is a block diagram illustrating a computer system architecture in accordance with exemplary embodiments.

Each blockchain network 106 and 110 may be comprised of a plurality of blockchain nodes 108 and 112, respectively. Each blockchain node 108 and 112 may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network using the public key of the cryptographic key pair. In some cases, the term "blockchain wallet" may refer specifically to the private key. In other cases, the term "blockchain wallet" may refer to a computing device (e.g., sender device 102 and receiver device 104) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 102) that is generated using the sender's private key, a blockchain address of the recipient of currency (e.g., a receiver device 104) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 108 or 112 in the blockchain network 106 or 110, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 106 or 110 before being added to the blockchain and distributed to all of the blockchain nodes 108 or 112 in the blockchain network 106 or 110, respectively, in traditional blockchain implementations. In cases where a blockchain data value may not be related to a blockchain transaction, but instead the storage of other types of data, blockchain data values may still include or otherwise involve the validation of a digital signature.

In the system 100, the sender device 102 and receiver device 104 (e.g., or entities in control or possession thereof) may be interested in exchanging assets that are stored on the first blockchain of the first blockchain network 106 and the second blockchain of the second blockchain network 110. For example, the sender device 102 may have an amount of a first digital currency on the first blockchain that they are interested in exchanging with a second digital currency on the second blockchain that the receiver device 104 has (e.g., through blockchain wallets associated therewith). In a traditional system, each blockchain network 106 and 110 would have to configure their respective blockchain to enable such an exchange and to ensure that the assets are transferred on both blockchains.

In the system 100, a proposal message may be generated and signed by both parties, the sender device 102 and receiver device 104, that serves as a confirmation of transactions to be conducted on both the first blockchain and the second blockchain as agreed upon by both parties. The proposal message may be generated by the sender device 102 or the receiver device 104, and includes a transaction value and network identifier for both of the transactions. The transaction value may be the data that will be transmitted to a blockchain node 108 or 112 to accomplish a transaction for the transfer of assets on the respective blockchain (e.g., from the sender device 102 to the receiver device 104 on one blockchain and from the receiver device 104 to the sender device 102 on the other blockchain). The network identifier may be a unique value that is associated with the respective blockchain network 106 or 110 that may be used to identify the blockchain.

The proposal message may also include a public key of a cryptographic key pair generated for the atomic exchange, referred to herein as a "swap" key pair, where the public key may be referred to herein as a "swap public key." The swap key pair may be generated by the sender device 102 or the receiver device 104 and may include the swap public key and a corresponding swap private key. In some cases, the device generating the proposal message may generate the swap key pair. In other cases, the other device may generate the swap key pair and may electronically transmit both keys to the other device.

The proposal message may accordingly include the swap public key and the transaction value and network identifier for both desired blockchain transactions. The device that generates the proposal message may digitally sign the proposal message. In some embodiments, the device may generate a Merkle tree using the transaction values and network identifiers in a predetermined order and may digitally sign the root of the Merkle tree. The device may then encrypt the digital signature using a combination of the swap public key and their own private key (e.g., the private key of the cryptographic key pair used as their blockchain wallet, which may be a blockchain wallet used for both the first blockchain and the second blockchain, or a blockchain wallet used for either the first blockchain or the second blockchain). In some cases, if the device has more than one cryptographic key pair, the private key used may be predetermined according to one or more established rules, such as the private key of the blockchain transaction for which the device is the sender. The encrypted digital signature may be appended, prepended, or otherwise added to the proposal message in a predetermined location.

The proposal message may then be transmitted by the generating device to the next device, such as from the sender device 102 to the receiver device 104. The receiver device 104 may validate the transaction values and network identifiers to ensure that the transactions are correct and were as agreed upon, such as to ensure that the assets being transferred are in the proper amounts. If the receiver device 104 (e.g., or sender device 102, as applicable) is satisfied with the transaction values and network identifiers, then the receiver device 104 may generate their own digital signature for the proposal message. The digital signature may be generated using the same data as was used by the sender device 102 in the first digital signature that was generated for the proposal message (e.g., the root of a Merkle tree generated using the transaction values and network identifiers). The receiver device 104 may then encrypt its digital signature using the swap public key (e.g., retrieved from the received proposal message) and its own private key (e.g., as determined according to any applicable rules, as discussed above). The encrypted digital signature of the receiver device 104 may be added to the proposal message in a predetermined manner, such as appended to the end of the proposal message after the sender device's encrypted digital signature.

The proposal message with both encrypted digital signatures may then be submitted to a blockchain node 108 and 112 in the first blockchain network 106 and the second blockchain network 110, respectively. Each of the blockchain nodes 108 and 112 may include the proposal message in a new block that is generated and confirmed and added to the respective blockchain. In some embodiments, separate proposal messages may be generated for each of the blockchains, where the transaction value for the other blockchain may be replaced by a hash of that transaction value. In such instances, the digital signature generated for each proposal message may be different as a result of the changed transaction values in the respective proposal message. The replacement of one of the transaction values in each of the proposal messages with a hash value may result in a significant file size reduction for the proposal message, which may increase performance for each of the blockchains.

After the proposal message has been added to both of the blockchains, each of the sender device 102 and the receiver device 104 may view the proposal message added to each of the blockchains, such as to ensure that the other entity agreed to both transactions and added their digital signature. Once the proposal messages have been added to the blockchains, the atomic exchange can be confirmed, which will result in the swap being executed and the ownership of the assets transferred as indicated. To confirm the swap, one of the devices (e.g., the sender device 102 or receiver device 104) may generate a swap confirmation message. The swap confirmation message may include at least a hash reference to the proposal message and the swap private key of the swap key pair. The hash reference of the proposal message may be a hash value of the proposal message generated via applying a suitable hashing algorithm to the finalized proposal message added to the blockchain. In cases where each blockchain receives a different proposal message, a separate swap confirmation message may be generated for each blockchain using a hash reference to the appropriate proposal message.

The completed swap confirmation message may then be transmitted to a blockchain node 108 or 112 in the appropriate blockchain network 106 or 110, which may then include the swap confirmation message in a new block that is generated and confirmed using traditional methods and systems. The result is, with the proposal message and swap confirmation message, the transaction value included in the proposal message will be honored as a valid transaction, and thus the digital assets will have been exchanged in both blockchains.

With the publishing of the swap private key in the swap confirmation message, any interested entity or system, such as a validation system 114, may be able to validate the swap. Validation of the swap may include validating both encrypted digital signatures that were included in the proposal message. As each digital signature is encrypted using the swap public key and the private key of the respective device (e.g., the sender device 102 or receiver device 104, as applicable), decryption can be performed using the swap private key and the public key of the respective device, which may be available in the blockchain itself or made available by the device. For example, the validation system 114 may contact the sender device 102 and receiver device 104 for validation of the swap, where the sender device 102 and receiver device 104 may provide their respective public keys. The validation system 114 can use the swap private key from the swap confirmation message and the public key from each device to decrypt the respective digital signature and then validate that digital signature. This way, the validation system 114 can validate the swap to ensure that the proposal was properly signed by the involved entities (e.g., as the public key used to decrypt the signature is from the same wallet used in the transfer of assets). Encryption and decryption using keys as discussed above can be performed using shared secrets, such as via the Elliptic-curve Diffie-Hellman (ECDH) protocol or other elliptic curve cryptographic techniques. For instance, the RSA cryptosystem may be used alternatively, where the swap public key is used for encryption and the swap private key for the decryption.

In some embodiments, a transfer of assets may involve more than two entities and/or more than two blockchains. In such instances, the proposal message may include additional transaction values and network identifiers for the additional asset transfers, and the proposal messages and swap confirmation messages may be transmitted to any additional blockchain nodes for any additional blockchain networks as necessary. The methods and systems discussed herein enable the atomic exchange of assets to occur using the same methodology regardless of the number of transfers, entities, or blockchains involved as well as being agnostic as to the formatting and implementation of each blockchain.

Thus, the methods and systems discussed herein provide for significant improvements in the atomic exchange of digital assets in multiple blockchains. Because the methods discussed herein are agnostic to the blockchains, the methods can be applied to any of the thousands and thousands of blockchains currently in existence that involve digital assets without modification, and would still be applicable to any new blockchains that are developed and not currently in existence. Additionally, the methods discussed herein are applicable for any number of entities or asset transfers involved, with the only difference being the size of the confirmation message (e.g., where the use of hashes for any transaction value not applicable to an individual blockchain, as discussed above, can facilitate the additional transactions with minimal addition to file size). Accordingly, the methods and systems discussed herein provide for significant improvements over existing methods for enabling the atomic exchange of digital assets across multiple blockchains.

Computing Device

Figure 2:
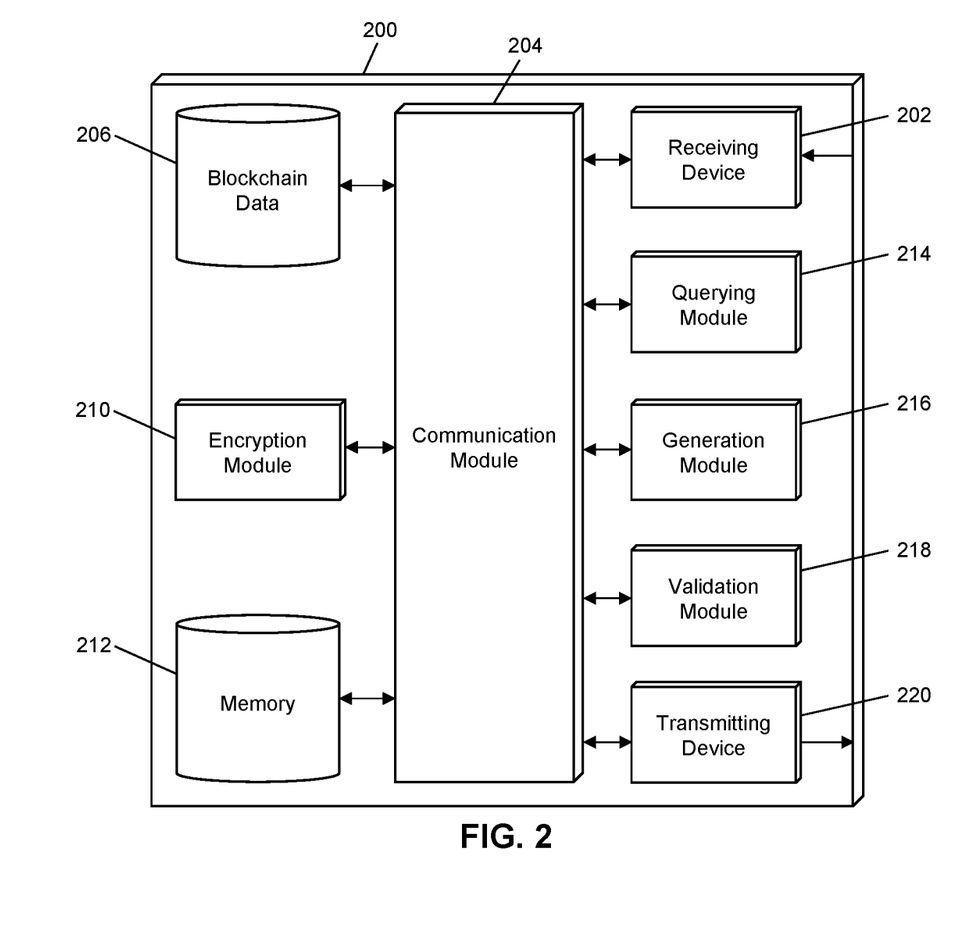
FIG. 2 is a block diagram illustrating a computing device of the system of FIG. 1 for the atomic exchange of digital assets in multiple blockchains in accordance with exemplary embodiments.

FIG. 2 illustrates an embodiment of a computing device 200, such as may be used as the sender device 102 or receiver device 104 in the system 100. It will be apparent to persons having skill in the relevant art that the embodiment of the computing device 200 illustrated in FIG. 2 is provided as illustration only and may not be exhaustive to all possible configurations of the computing device 200 suitable for performing the functions as discussed herein. For example, the computer system 500 illustrated in FIG. 5 and discussed in more detail below may be a suitable configuration of the computing device 200.

The computing device 200 may include a receiving device 202. The receiving device 202 may be configured to receive data over one or more networks via one or more network protocols. In some instances, the receiving device 202 may be configured to receive data from sender devices 102, receiver devices 104, blockchain nodes 108 and 112, validation systems 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by sender devices 102 or receiver devices 104, which may be superimposed or otherwise encoded with public keys, swap key pairs, transaction values, network identifiers, proposal messages, or other data for use in performing the methods discussed herein. The receiving device 202 may also be configured to receive data signals electronically transmitted by validation systems 114, such as may be superimposed or otherwise encoded with a public key request for use in validating a swap. The receiving device 202 may be further configured to receive data signals electronically transmitted by blockchain nodes 108 and 112 that may be superimposed or otherwise encoded with blockchain data, such as for identifying when a proposal message has been successfully added to a blockchain associated therewith.

The computing device 200 may also include a communication module 204. The communication module 204 may be configured to transmit data between modules, engines, databases, memories, and other components of the computing device 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 200 and external components of the computing device 200, such as externally connected databases, display devices, input devices, etc. The computing device 200 may also include a processing device. The processing device may be configured to perform the functions of the computing device 200 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 200 may also include blockchain data 206, which may be stored in a memory 212 of the computing device 200 or stored in a separate area within the computing device 200 or accessible thereby. The blockchain data 206 may include a blockchain, which may be comprised of a plurality of blocks and be associated with the blockchain network 106, 110. The blockchain data 206 may also or alternatively include any data associated with one or more blockchain wallets that may be used by the computing device 200, such as cryptographic key pairs, unspent transaction outputs, digital asset amounts, network identifiers for blockchain networks 106 and 110, swap key pairs, signature generation algorithms, encryption algorithms, etc.

The computing device 200 may also include a memory 212. The memory 212 may be configured to store data for use by the computing device 200 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the computing device 200 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information for blockchain nodes 108 and 112 and blockchain networks 106 and 110, address generation and validation algorithms, digital signature generation and validation algorithms, hashing algorithms for generating reference values, etc.

The computing device 200 may include a querying module 214. The querying module 214 may be configured to execute queries on databases to identify information. The querying module 214 may receive one or more data values or query strings, and may execute a query string based thereon on an indicated database, such as the memory 212 of the computing device 200 to identify information stored therein. The querying module 214 may then output the identified information to an appropriate engine or module of the computing device 200 as necessary. The querying module 214 may, for example, execute a query on the blockchain data 206 to identify a public key to be used to encrypt a digital signature generated over a proposal message.

The computing device 200 may also include a generation module 216. The generation module 216 may be configured to generate data for use by the computing device 200 in performing the functions discussed herein. The generation module 216 may receive instructions as input, may generate data based on the instructions, and may output the generated data to one or more modules of the computing device 200. For example, the generation module 216 may be configured to generate proposal messages, swap confirmation messages, digital signatures, data signals, key pairs, etc.

The computing device 200 may also include an encryption module 210. The encryption module 210 may be configured to encrypt data or decrypt encrypted data using keys and encryption algorithms, such as may be stored in the blockchain data 206 or memory 212 of the computing device 200 or received by the receiving device 202 thereof. The encryption module 210 may receive data and an instruction as input, and may encrypt or decrypt the data as instructed, and output the resulting encrypted or decrypted data to another module or engine of the computing device 200. The encryption module 210 may be configured to, for example, encrypt digital signatures using a swap public key and other private key, decrypt digital signatures using a swap private key and other public key, etc.

The computing device 200 may also include a validation module 218. The validation module 218 may be configured to perform validations for the computing device 200 as part of the functions discussed herein. The validation module 218 may receive instructions as input, which may also include data to be used in performing a validation, may perform a validation as requested, and may output a result of the validation to another module or engine of the computing device 200. The validation module 218 may, for example, be configured to validate digital signatures using suitable signature generation algorithms and keys, validate transaction values, and other data as discussed herein.

The computing device 200 may also include a transmitting device 220. The transmitting device 220 may be configured to transmit data over one or more networks via one or more network protocols. In some instances, the transmitting device 220 may be configured to transmit data to sender devices 102, receiver devices 104, blockchain nodes 108 and 112, validation systems 114, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to sender devices 102 or receiver devices 104, which may be superimposed or otherwise encoded with public keys, swap key pairs, transaction values, network identifiers, proposal messages, or other data for use in performing the methods discussed herein. The transmitting device 220 may also be configured to electronically transmit data signals to validation systems 114, such as may be superimposed or otherwise encoded with a public key for use in validating a swap. The transmitting device 220 may be further configured to electronically transmit data signals to blockchain nodes 108 and 112 that may be superimposed or otherwise encoded with proposal messages, swap confirmation messages, and any other data used as discussed herein.

Process for the Atomic Exchange of Digital Assets

Figure 3A:
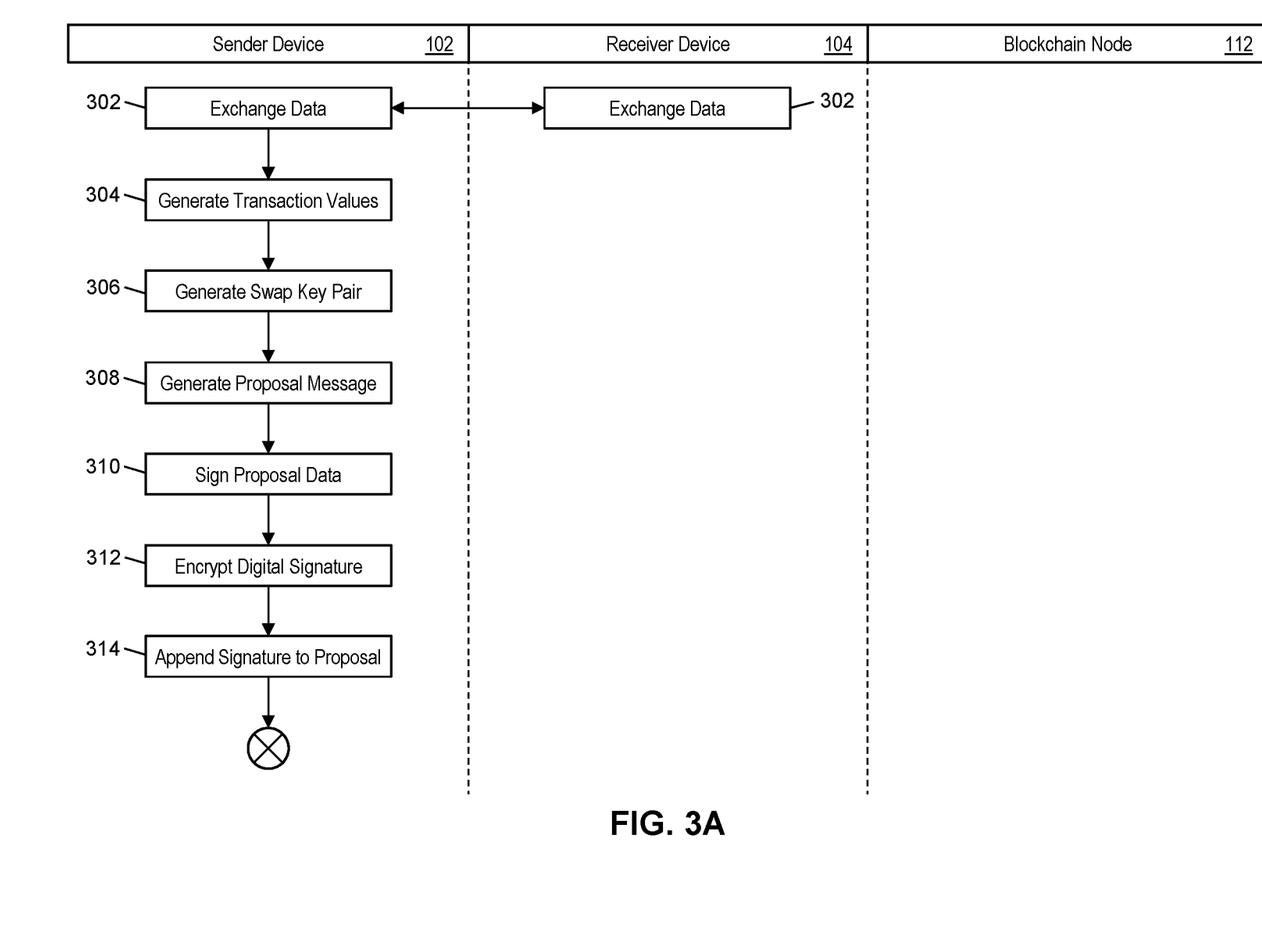
FIGS. 3A-3C are a flow diagram illustrating a process for atomic exchange of digital assets on multiple blockchains in accordance with exemplary embodiments.
Figure 3B:
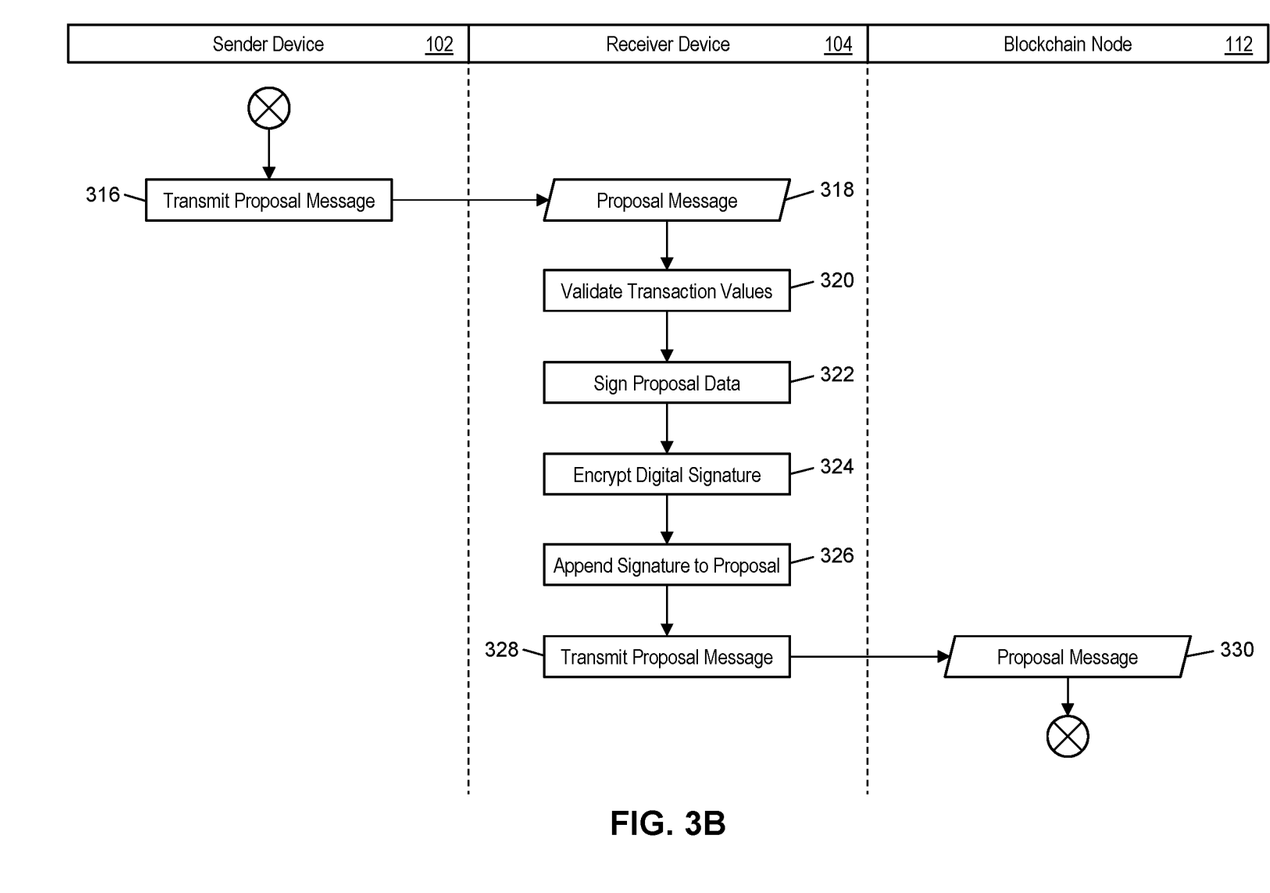
Figure 3C:
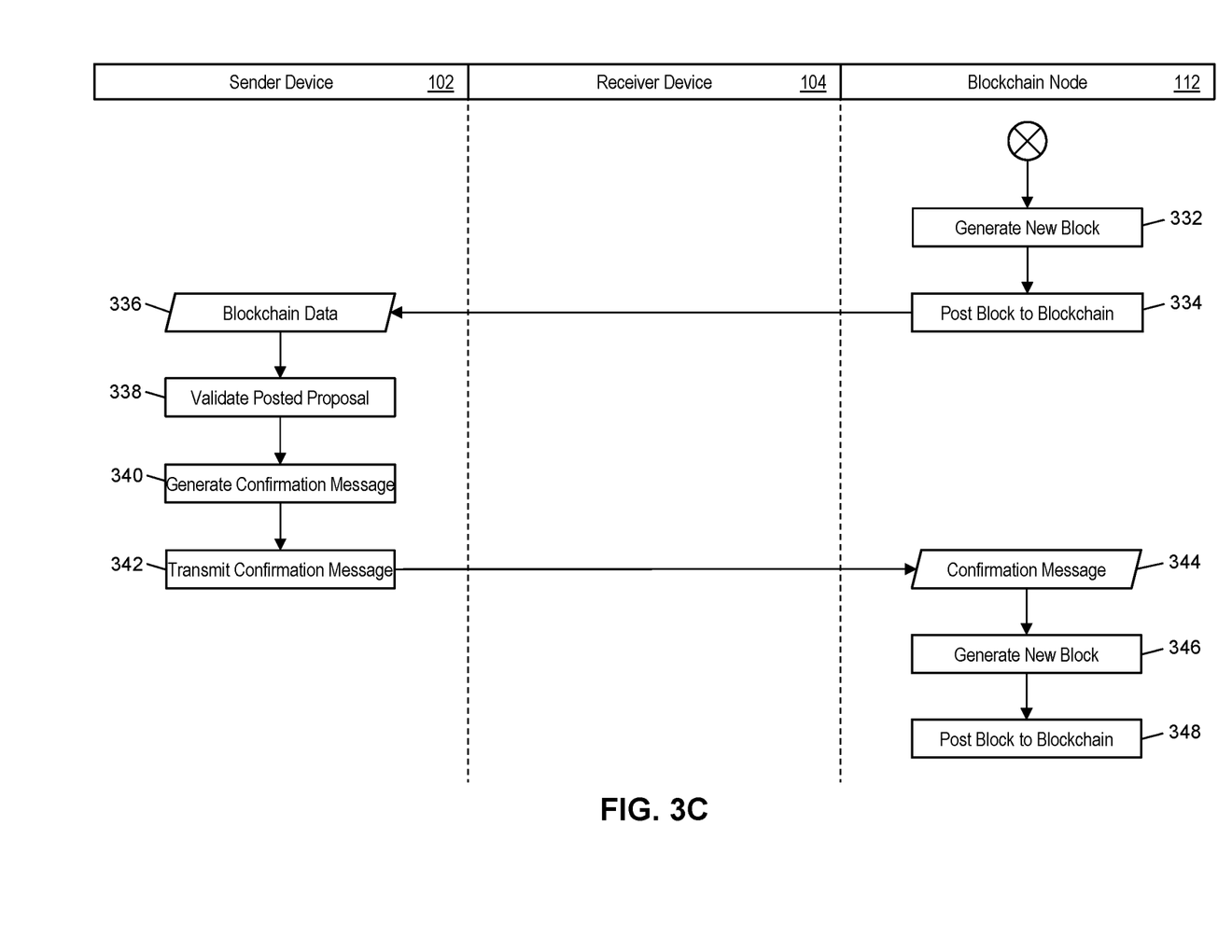

FIGS. 3A-3C illustrate a process for the atomic exchange of digital assets on two different blockchains through the use of a transient key pair, referred to herein as a swap key pair.

In step 302, the sender device 102 and receiver device 104 may perform a data exchange to agree on a pair of blockchain transactions to facilitate an exchange of digital assets between the parties associated with the devices. The exchange of data may include the exchange of public keys, unspent transaction outputs, digital signatures, asset amounts, and other data necessary for a blockchain transaction to be processed on each of the blockchain networks 106 and 110. At the end of step 302, the sender device 102 may have sufficient data to be able to generate a transaction value for each of the two blockchain networks 106 and 110 for the exchange of assets between the sender device 102 and receiver device 104 through a blockchain transaction to be conducted on each blockchain.

In step 304, the generation module 216 of the sender device 102 may generate the transaction values for the first and second blockchain transactions to accomplish the exchange of digital assets. In step 306, the generation module 216 of the sender device 102 may generate a swap cryptographic key pair using a suitable key generation algorithm. In step 308, the generation module 216 of the sender device 102 may generate a proposal message for the atomic exchange. The proposal message may include at least the swap public key of the swap key pair as well as the transaction value and a network identifier for both blockchain transactions, where the network identifier is a unique identifier for the associated blockchain network 106 or 110. In step 310, the generation module 216 of the sender device 102 may sign the proposal data by generating a digital signature over a root of a Merkle tree generated using the two transaction values and network identifiers. In step 312, the encryption module 210 of the sender device 102 may encrypt the digital signature using ECDH by using the swap public key and a private key of the sender device 102, such as the private key for a cryptographic key pair that serves as a blockchain wallet for the sender device 102 for one of the blockchains on which the asset transfer is being performed. In step 314, the sender device 102 may append the encrypted digital signature to the proposal message.

In step 316, the transmitting device 220 of the sender device 102 may electronically transmit the proposal message with the encrypted digital signature included to the receiver device 104 using a suitable communication method and system. In step 318, a receiving device 202 of the receiver device 104 may receive the proposal message. In step 320, a validation module 218 of the receiver device 104 may validate the two transaction values and network identifiers in the proposal message to ensure that the two blockchain transactions are suitable, such as being correct as to what both parties agreed upon for the exchange of digital assets. In step 322, a generation module 216 of the receiver device 104 may generate its own digital signature for the proposal message by signing the root of the Merkle tree generated using the transaction values and network identifiers. In step 324, the encryption module 210 of the receiver device 104 may encrypt the generated digital signature using the swap public key, as identified in the received proposal message, and a private key of the receiver device 104, such as the private key for a cryptographic key pair that serves as a blockchain wallet for the receiver device 104 for one of the blockchains on which the asset transfer is being performed. In step 326, this additional encrypted digital signature may be appended to the proposal message, such as after the first encrypted digital signature.

In step 328, the transmitting device 220 of the receiver device 104 may electronically transmit the proposal message with both encrypted digital signatures to a blockchain node 112 (e.g., the receiver device 104 may transmit the proposal message to a blockchain node for every blockchain network involved in the asset exchange, but for the sake of expediency, the actions performed by a blockchain node in just one of the blockchain networks are illustrated in FIGS. 3A-3C and discussed herein). In step 330, the blockchain node 112 may receive the proposal message from the receiver device 104 using a suitable communication network and method.

In step 332, the blockchain node 112 may generate a new block for its blockchain using traditional methods and systems, where the proposal message is included in the new block as a transaction data value stored therein. In step 334, the new block may be posted to the blockchain using traditional methods and systems, such as by the new block being distributed to other blockchain nodes in the blockchain network 110 and confirmed by a majority of the blockchain nodes, thereby being considered added to the blockchain as its next block. In step 336, the receiving device 202 of the sender device 102 may receive the new block on the blockchain, such as directly from a blockchain node 112 or other suitable method.

In step 338, the validation module 218 of the sender device 102 may validate the proposal message to ensure that the proposal message is accurate, such as that none of the transaction values was changed and that the second encrypted digital signature has been appended thereto. In step 340, the generation module 216 of the sender device 102 may generate a confirmation message for the exchange of digital assets. The confirmation message may include the swap private key as well as a reference value for the proposal message. In some embodiments, the reference value may be a hash value generated via the application of a hashing algorithm to the proposal message that had been added to the blockchain in the new block. In step 342, the transmitting device 220 of the sender device 102 may electronically transmit the confirmation message to the blockchain node 112 using a suitable communication network and method.

In step 344, the blockchain node 112 may receive the confirmation message. In step 346, a new block may be generated by the blockchain node 112 for its blockchain, where the new block includes the confirmation message. The block may be distributed to other blockchain nodes in the blockchain network 110 for confirmation and, in step 348, the new block with the confirmation message may be added to the blockchain. With the addition of the confirmation message, the blockchain transactions on both blockchains may thereby be considered processed, where each of the sender device 102 and receiver device 104 will have then received the digital assets from the other device on the blockchains.

Exemplary Method for Atomic Exchange of Assets on Multiple Blockchains

Figure 4:
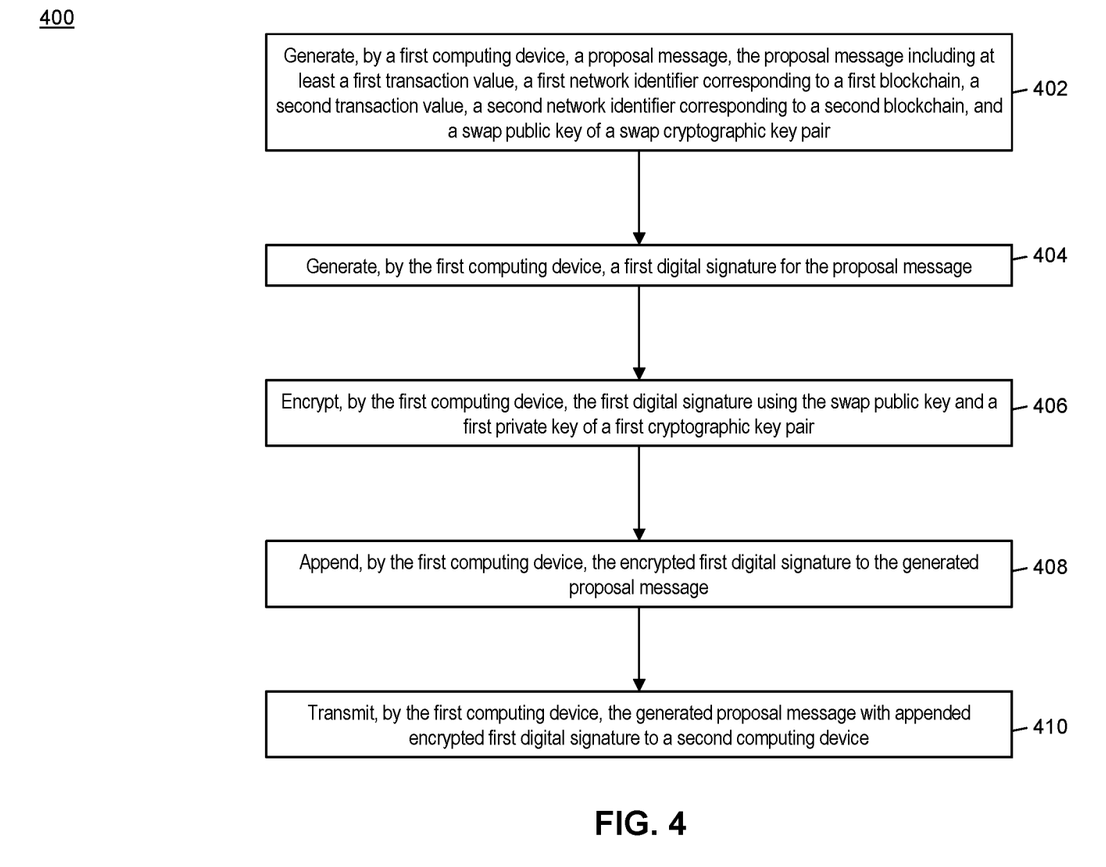
FIG. 4 is a flow chart illustrating an exemplary method for atomic exchange of assets on multiple blockchains using transient key pairs in accordance with exemplary embodiments.

FIG. 4 illustrates a method 400 for the atomic exchange of digital assets across multiple blockchains via the use of transient key pairs, which is agnostic as to the formatting and implementation of the blockchain as well as the number of blockchains and asset transfers involved.

In step 402, a proposal message may be generated (e.g., by a generation module 216) of a first computing device (e.g., the sender device 102), the proposal message including at least a first transaction value, a first network identifier corresponding to a first blockchain, a second transaction value, a second network identifier corresponding to a second blockchain, and a swap public key of a swap cryptographic key pair. In step 404, a first digital signature may be generated by the first computing device for the proposal message. In step 406, the first digital signature may be encrypted (e.g., by an encryption module 210) of the first computing device using the swap public key and a first private key of a first cryptographic key pair.

In step 408, the encrypted first digital signature may be appended to the generated proposal message by the first computing device. In step 410, the generated proposal message with the appended encrypted first digital signature may be electronically transmitted (e.g., by a transmitting device 220) of the first computing device to a second computing device (e.g., receiver device 104).

In one embodiment, the method 400 may further include: generating, by the second computing device, a second digital signature for the proposal message; encrypting, by the second computing device, the second digital signature using the swap public key and a second private key of a second cryptographic key pair; appending, by the second computing device, the encrypted second digital signature to the generated proposal message with appended encrypted first digital signature; and transmitting, by the second computing device, the generated proposal message with appended encrypted first digital signature and appended encrypted second digital signature. In a further embodiment, the generated proposal message may be transmitted by the second computing device to at least one of a plurality of blockchain nodes (e.g., blockchain node 112) in a blockchain network (e.g., blockchain network 110) associated with the second blockchain. In an even further embodiment, the method 400 may even further include: generating, by the first computing device, a confirmation message, the confirmation message including at least (i) a hash value generated using the generated proposal message with appended encrypted first digital signature and appended encrypted second digital signature, and (ii) a swap private key of the swap cryptographic key pair; and transmitting, by the first computing device, the generated confirmation message to a blockchain node in the plurality of blockchain nodes in the blockchain network associated with the second blockchain. In a yet further embodiment, the method 400 may still further include: retrieving, by a third computing device (e.g., validation system 114), the generated confirmation message and the generated proposal message with appended encrypted first digital signature and appended encrypted second digital signature from the second blockchain; decrypting, by the third computing device, the first digital signature using the swap private key in the retrieved confirmation message and a first public key of the first cryptographic key pair; and validating, by the third computing device, the decrypted first digital signature.

In some embodiments, the method 400 may further include generating, by the first computing device, the swap cryptographic key pair prior to generating the proposal message. In one embodiment, the first digital signature may be generated by signing the first transaction value, first network identifier, second transaction value, and second network identifier in the proposal message. In some embodiments, the first transaction value may include a hash value generated using transaction data for a first blockchain transaction using the first blockchain and the second transaction value may include transaction data for a second blockchain transaction using the second blockchain.

Computer System Architecture

FIG. 5 illustrates a computer system 500 in which embodiments of the present disclosure, or portions thereof, may be implemented as computer-readable code. For example, the sender device 102 and receiver device 104 of FIG. 1 and the computing device 200 of FIG. 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A-3C and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A-3C and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for atomic exchange of assets on multiple blockchains using transient key pairs. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for atomic exchange of assets on multiple blockchains using transient key pairs, comprising:
generating, by a first computing device, a proposal message, the proposal message including at least a first transaction value, a first network identifier corresponding to a first blockchain, a second transaction value, a second network identifier corresponding to a second blockchain, and a swap public key of a swap cryptographic key pair;
generating, by the first computing device, a first digital signature for the proposal message;
encrypting, by the first computing device, the first digital signature using the swap public key and a first private key of a first cryptographic key pair;
appending, by the first computing device, the encrypted first digital signature to the proposal message; and
transmitting, by the first computing device, the proposal message with appended encrypted first digital signature to a second computing device, wherein the first transaction value includes a hash value generated using transaction data for a first blockchain transaction using the first blockchain and the second transaction value include transaction data for a second blockchain transaction using the second blockchain.

2. The method of claim 1, further comprising:
generating, by the second computing device, a second digital signature for the proposal message;
encrypting, by the second computing device, the second digital signature using the swap public key and a second private key of a second cryptographic key pair;
appending, by the second computing device, the encrypted second digital signature to the proposal message with appended encrypted first digital signature; and
transmitting, by the second computing device, the proposal message with appended encrypted first digital signature and appended encrypted second digital signature.

3. The method of claim 2, wherein the proposal message is transmitted by the second computing device to at least one of a plurality of blockchain nodes in a blockchain network associated with the second blockchain.

4. The method of claim 3, further comprising:
generating, by the first computing device, a confirmation message, the confirmation message including at least (i) a hash value generated using the proposal message with appended encrypted first digital signature and appended encrypted second digital signature, and (ii) a swap private key of the swap cryptographic key pair; and
transmitting, by the first computing device, the generated confirmation message to a blockchain node in the plurality of blockchain nodes in the blockchain network associated with the second blockchain.

5. The method of claim 4, further comprising:
retrieving, by a third computing device, the generated confirmation message and the proposal message with appended encrypted first digital signature and appended encrypted second digital signature from the second blockchain;
decrypting, by the third computing device, the first digital signature using the swap private key in the retrieved confirmation message and a first public key of the first cryptographic key pair; and
validating, by the third computing device, the decrypted first digital signature.

6. The method of claim 1, further comprising:
generating, by the first computing device, the swap cryptographic key pair prior to generating the proposal message.

7. The method of claim 1, wherein the first digital signature is generated by signing the first transaction value, the first network identifier, the second transaction value, and the second network identifier in the proposal message.

8. A system for atomic exchange of assets on multiple blockchains using transient key pairs, comprising:
   a first computing device,
   a second computing device,
   a first blockchain, and
   a second blockchain, wherein
   the first computing device
      generates a proposal message, the proposal message including at least a first transaction value, a first network identifier corresponding to the first blockchain, a second transaction value, a second network identifier corresponding to the second blockchain, and a swap public key of a swap cryptographic key pair,
      generates a first digital signature for the proposal message,
      encrypts the first digital signature using the swap public key and a first private key of a first cryptographic key pair,
      appends the encrypted first digital signature to the proposal message, and
      transmits the proposal message with appended encrypted first digital signature to a second computing device, wherein the first transaction value includes a hash value generated using transaction data for a first blockchain transaction using the first blockchain and the second transaction value include transaction data for a second blockchain transaction using the second blockchain.

9. The system of claim 8, wherein the second computing device
   generates a second digital signature for the proposal message,
   encrypts the second digital signature using the swap public key and a second private key of a second cryptographic key pair,
   appends the encrypted second digital signature to the proposal message with appended encrypted first digital signature, and
   transmits the proposal message with appended encrypted first digital signature and appended encrypted second digital signature.

10. The system of claim 9, further comprising:
    a blockchain network associated with the second blockchain; and
    a plurality of blockchain nodes in the blockchain network, wherein
    the proposal message is transmitted by the second computing device to at least one of the plurality of blockchain nodes.

11. The system of claim 10, wherein the first computing device further
    generates a confirmation message, the confirmation message including at least (i) a hash value generated using the proposal message with appended encrypted first digital signature and appended encrypted second digital signature, and (ii) a swap private key of the swap cryptographic key pair, and
    transmits the generated confirmation message to a blockchain node in the plurality of blockchain nodes in the blockchain network associated with the second blockchain.

12. The system of claim 11, further comprising:
    a third computing device, wherein the third computing device
       retrieves the generated confirmation message and the proposal message with appended encrypted first digital signature and appended encrypted second digital signature from the second blockchain,
       decrypts the first digital signature using the swap private key in the retrieved confirmation message and a first public key of the first cryptographic key pair, and
       validates the decrypted first digital signature.

13. The system of claim 8, wherein the first computing device further generates the swap cryptographic key pair prior to generating the proposal message.

14. The system of claim 8, wherein the first digital signature is generated by signing the first transaction value, the first network identifier, the second transaction value, and the second network identifier in the proposal message.

* * * * *